United States Patent [19]
Flores

[11] Patent Number: 5,551,375
[45] Date of Patent: Sep. 3, 1996

[54] PET WASTE BOX

[76] Inventor: J. Esteban Flores, 11711 E. 27th St., Tulsa, Okla. 74129

[21] Appl. No.: 491,450

[22] Filed: Jun. 16, 1995

[51] Int. Cl.⁶ .................................................. A01K 29/00
[52] U.S. Cl. .......................................................... 119/166
[58] Field of Search ..................................... 119/165, 166, 119/168

[56] References Cited

U.S. PATENT DOCUMENTS

| | | | |
|---|---|---|---|
| 4,120,264 | 10/1978 | Carter | 119/166 |
| 4,574,735 | 3/1986 | Hohenstein | 119/166 |
| 4,846,104 | 7/1989 | Pierson, Jr. | 119/166 |
| 5,048,464 | 9/1991 | Shirley | 119/166 |
| 5,107,797 | 4/1992 | LaRoche | 119/166 |
| 5,353,743 | 10/1994 | Walton | 119/166 |

Primary Examiner—Gene Mancene
Assistant Examiner—Thomas Price
Attorney, Agent, or Firm—Hovey, Williams, Timmons & Collins

[57] ABSTRACT

A pet waste box is provided for collecting waste deposited by a pet, and for subsequent removal and disposal of the pet waste. The waste box comprises a housing including opposed first and second sidewalls, opposed front and back walls, and opposed top and bottom walls, an interior space defined by the walls for retaining pet litter and pet waste, a first opening through which a pet may enter and exit the housing, a second opening, and a structure for supporting the housing for rotation about a horizontal axis. The housing also includes a structure for closing the first opening, and a removable drawer received through the second opening and having a waste separation screen and a waste retaining partition. The screen and the partition are positioned within the housing so that, as the housing is rotated through one revolution, the screen separates the waste from the litter, and the waste is retained between the partition and the screen. The waste is then disposed by removing the drawer from the housing, and emptying the waste into an appropriate receptacle.

12 Claims, 3 Drawing Sheets

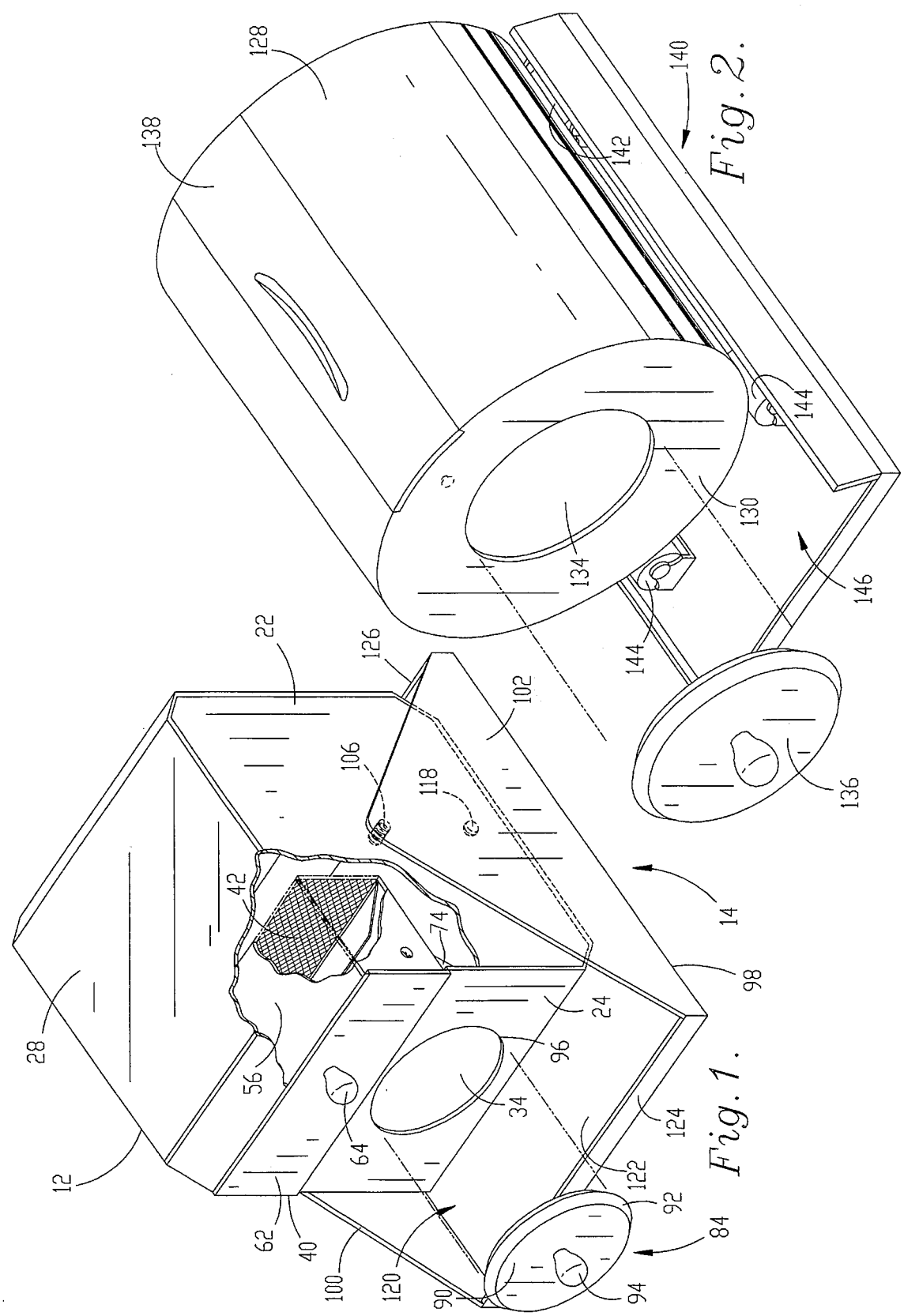

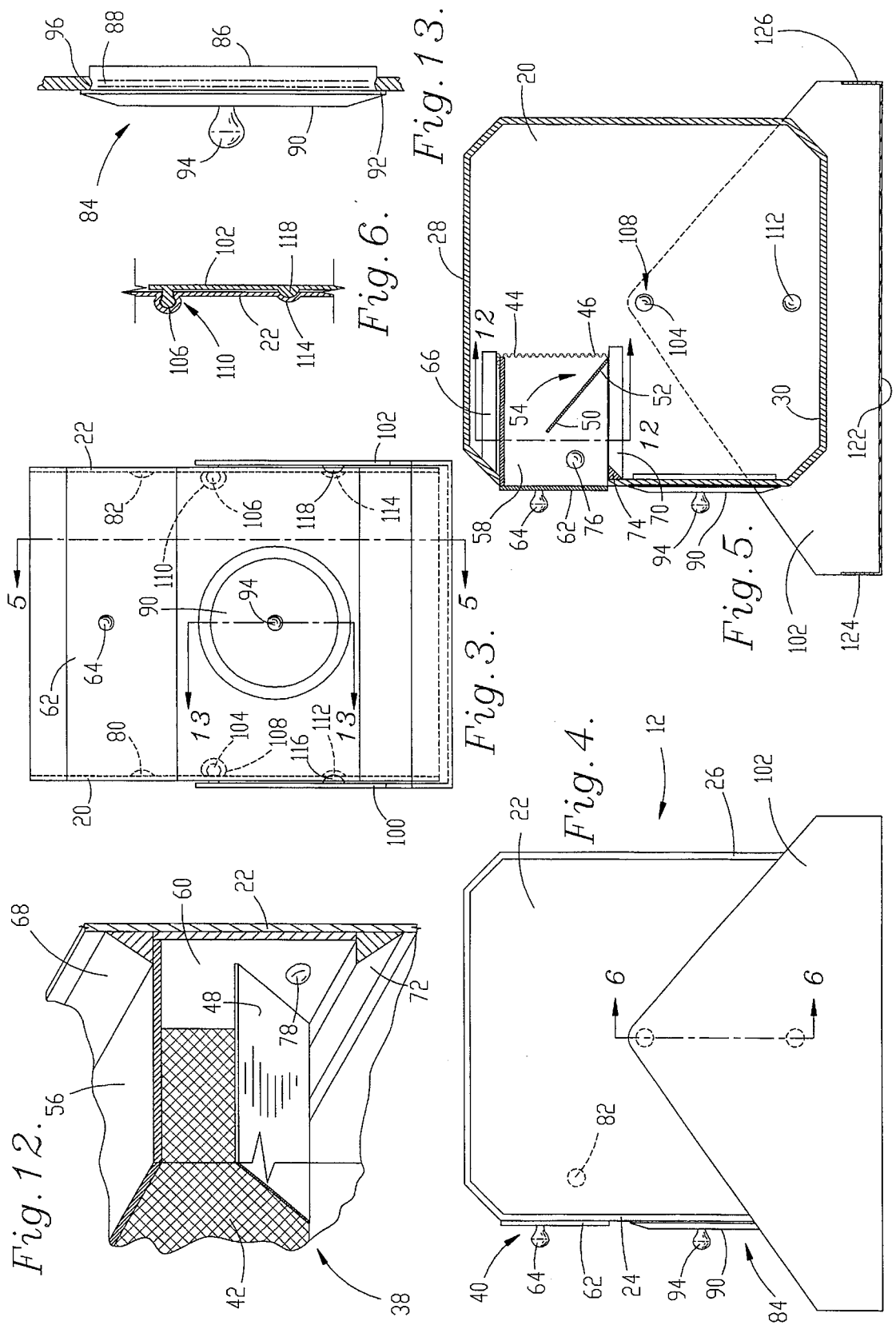

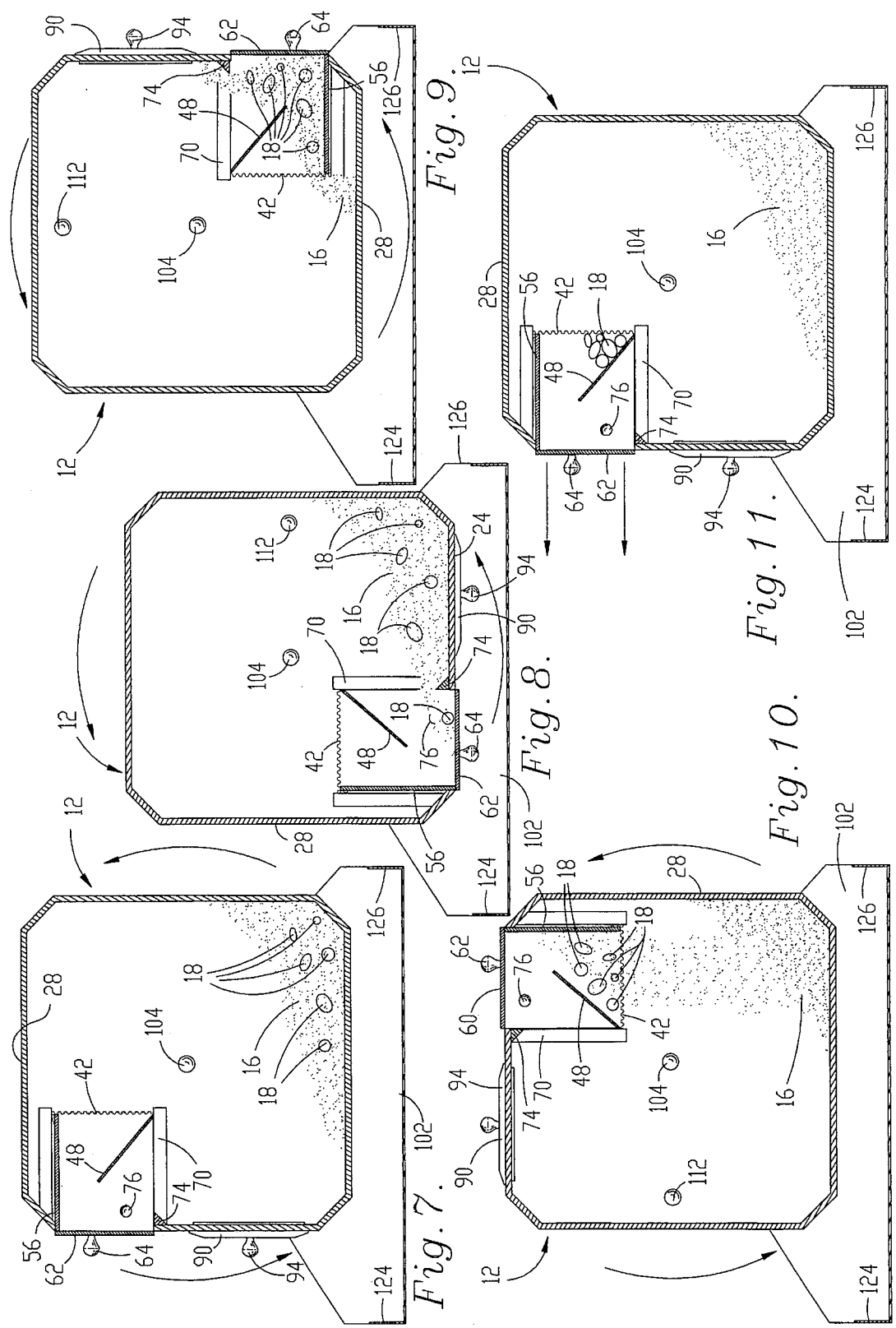

PET WASTE BOX

BACKGROUND OF THE INVENTION

1. Field of the Invention

The present invention relates to an apparatus used for collecting and disposing pet waste. More particularly, the apparatus has an improved means for separating the pet waste from the litter retained in the apparatus for removal therefrom and subsequent disposal, and which allows the waste to dry faster, thereby reducing the odors and fumes associated with the waste.

2. Description of the Prior Art

A known problem with the ownership of house pets is the unpleasant and sometimes noxious odors and fumes associated with pet waste. Conventional waste boxes are frequently used for collecting pet waste in a quantity of litter so as to reduce the pet waste odor in the environment surrounding the box. Such boxes include an open tray which retains a quantity of litter accessible to the pet. The litter is provided so that the pet may bury the waste within the litter. The litter also helps shield the odors and contain the fumes of the pet waste until the combined litter and waste are removed from the box and placed in a receptacle for disposal.

The litter changing process, however, requires a significant amount of human contact with the waste box, and waste residue, odor and fumes. Contact with pet waste is undesirable as it may cause toxoplasmosis, which is known to cause miscarriages, and may be spread from a pregnant woman to her child possibly resulting in neurological and ocular problems in the child. Also, the pet waste, litter dust, and waste fumes can be noxious to people leading to nausea and lung infections.

There are two known methods for cleaning conventional waste boxes which are typically employed. In the first method, the pet is allowed to deposit waste in the litter box over the course of several days until the litter is saturated. Once the litter is saturated with waste, the combined litter and waste is discarded, resulting in the use of unnecessary quantities of litter. In the second method, the operator scoops the litter with a filtering device by hand. This method requires relatively frequent cleaning. In each method the operator is placed in close proximity to the waste, odor, fumes, and dust. Additionally, when waste boxes are used by pets, litter is often kicked out by the pet and is also scattered out of the box as the pet steps out of the box, further wasting litter, and requiring more cleaning.

Recently, clumping litter, which has finer granules than conventional litter, has been developed. Clumping litter forms hardened balls out of solid and liquid pet waste. These balls may be removed from the clean litter by a filtering scoop.

Although clumping litter is more expensive than conventional litter, the ability to remove liquid waste from the litter lengthens the amount of time that the litter may remain in the litter box, and results in an overall reduction in litter costs. However, the scooping process must be done in close proximity with the litter box, and is, therefore, an unpleasant experience. Also, the scooping process is not uniform and waste can be easily left behind, resulting in building odors.

Several waste boxes have been developed which attempt to address the problems listed above. Such devices generally provide a chamber for collecting pet waste in a quantity of pet litter, and are able to separate the waste from the litter and eject the waste from the chamber.

Several devices exist which include a rotating chamber having means for separating the waste from the litter by rotating the box, and ejecting the waste through an outlet. One such device, for example, includes a screen defining a helical coil mounted within the chamber, and an involute scoop at one end of the chamber adjacent an opening. As the chamber rotates, the screen separates the waste from the litter and pushes the waste to the scoop where it is lifted to the outlet for disposal. The chamber must be rotated numerous times in order to fully separate the waste from the litter, and cause the litter to be ejected from the chamber. Since this device remains in open communication with the surrounding environment, this device does not prevent the dust generated by rotation from escaping, nor does it address the litter scattering problem. Furthermore, this device does not adequately ventilate the accumulated waste to allow it to dry, leading to odor build-up in the chamber. These odors permeate the chamber, and subsequently the outside environment.

Another rotating device includes a chamber having an opening which is used in combination as a pet entrance and waste outlet. This device incorporates a screen which, as the chamber is rotated, sifts through the litter separating the waste from the litter, and a partition which acts in combination as a waste slide to allow the waste to fall out of the opening, and as a shield to retain the litter within the chamber. The waste then falls into a drawer positioned beneath the chamber. Since the chamber of this device must remain open for operation, and is thus in constant open communication with the surrounding environment, the problem of controlling and containing the dust and odor is not addressed. Additionally, the waste which is deposited in the drawer is not adequately dried, and, therefore, emits waste odor and fumes. Furthermore, this device does not include a means for preventing the litter scattering problem.

It is also notable that the prior art devices discussed above do not efficiently utilize space. For example, the various means for separating and removing waste from litter employed in the prior art devices have required the use of relatively large and clumsy chambers in order to provide sufficient interior room for use by a pet.

Therefore, a significant, and heretofore unsolved, need exists to provide a rotatable pet waste box having an improved means for separation of pet waste from litter, allowing the waste to be accumulated over many use cycles and suspended within the box for thorough drying so that odors may be continuously reduced, and so that the waste may be removed in a relatively odorless manner. There exists an additional need to provide a pet waste box which prevents dust from escaping and which reduces the amount of litter scattered out of the device. Furthermore, there exists the need to provide a pet waste box which more efficiently utilizes space, so that the box requires less room for operation.

OBJECTS AND SUMMARY OF THE INVENTION

An object of the present invention is to provide a rotatable pet waste box having a pet entrance which permits a pet to deposit waste in a quantity of litter contained within the box, and allows the waste to be separated from the litter and suspended within the box so that it may be accumulated for drying before it is removed from the box. Allowing the waste to dry reduces the odor and fumes associated with the pet waste.

Another object of the present invention is to provide a pet waste box which allows the litter carrying housing to be sealed in a substantially air-tight condition during rotation and for a period of time after rotation, so that the dust associated with rotating the waste and litter within the housing is allowed to settle before the waste is removed and the pet entrance is opened.

A further object of the present invention to prevent the scattering of litter from the box by positioning a litter collecting tray beneath the waste box. Such a tray is able to collect stray litter which is kicked and scattered out of the box by the pet, rather than having the litter fall onto the floor surrounding the box.

It is yet another object of the present invention to provide all of the advantages listed above in a light weight and portable unit which is less expensive to build than the prior art devices.

The pet waste box of the present invention addresses the problems with the prior art devices discussed above, and provides a significant advance in the state of the art. More particularly, the pet waste box possesses the ability to separate pet waste from litter, hold and accumulate the waste within the box as it dries, and to allow the removal of the waste from the box at a selected interval after the separation of the waste from the litter, while efficiently utilizing space.

The waste box broadly includes a rotatable housing configured for retaining pet litter, and means for supporting the housing for rotational movement about a horizontal axis. The housing includes opposed first and second sidewalls, a closeable first opening in the housing for permitting passage of a pet into and out of the housing for depositing its waste in the litter, a removable drawer or element, and a second opening in the housing configured for slidably receiving the drawer. The drawer includes a waste separation screen, and a waste retaining partition. The screen and the partition are positioned adjacent to each other so that they form a waste retaining V-shaped pocket. The housing is rotatably supported by a support stand which includes a litter-catching tray positioned beneath the housing.

The drawer is positioned within the housing so that, as the housing is rotated, the litter passes through the screen, separating the waste from the litter. As the housing continues to rotate, the waste is retained between the partition and the screen in the V-shaped pocket. The drawer of the present invention is an effective means for separating the waste from the litter which provides a more efficient use of the interior space of the housing. This allows the use of a housing having smaller exterior dimensions than has been heretofore required.

By providing a drawer which may be removed at a selected interval after the rotation, the operator may allow the waste to remain within the housing for a period of time after rotation which will ensure that the waste is fully dried when it is removed from the housing. The drawer is configured inside the housing in such a way as to allow air flow which promotes faster and more complete drying of the waste than the prior art. Allowing the waste to be more fully dried reduces the unpleasant odors and fumes associated with pet waste, which may result in nausea to the operator.

The box may be used by the pet while the drawer retains accumulated waste. Therefore, the box may be used by the pet while the waste is drying. The box may also be rotated while the drawer retains the waste, allowing the drawer to be removed less frequently than the box is rotated, further simplifying operation, while providing continuous odor reduction in between drawer emptying cycles.

The first opening is closed during the rotation of the housing, and for a short period of time after rotation. This allows the dust associated with rotating the box to settle within the housing rather than escaping into the environment surrounding the box, and inhaled by the operator which may lead to lung infections. The litter-catching tray assists in keeping the surrounding environment clean by catching litter which is kicked and scattered out of the box by the pet. Additionally, after rotation the litter is naturally angled towards the side of the housing opposite the first opening, further reducing the amount of litter kicked and scattered out of the box by the pet.

DESCRIPTION OF THE DRAWING FIGURES

FIG. 1 is a partial cut-a-way perspective view of one embodiment of a pet waste box constructed in accordance with the preferred embodiment.

FIG. 2 is a perspective view of an alternative embodiment of the pet waste box.

FIG. 3 is an elevational view of the pet waste box of FIG. 1.

FIG. 4 is an side elevational view of the pet waste box of FIG. 1.

FIG. 5 is a side elevational view of the pet waste box taken along line 5—5 of FIG. 3.

FIG. 6 is an elevational view taken along line 6—6 of FIG. 4.

FIGS. 7–11 are diagrammatic side elevations taken along line 5—5 of FIG. 3, depicting several of the operational positions of the pet waste box during rotation.

FIG. 12 is a perspective view taken along line 12—12 of FIG. 5.

FIG. 13 is a side elevational view taken along line 13—13 of FIG. 3.

DETAILED DESCRIPTION OF THE PREFERRED EMBODIMENT

Referring now to FIG. 1, a pet waste box comprises housing 12 and means 14 for supporting housing 12 for rotation. Housing 12 is configured for holding pet litter 16 in which a pet, such as a cat, may deposit and bury both solid and liquid pet waste 18, as depicted in FIG. 7. Housing 12 is preferably constructed of synthetic resin material, but may alternatively be formed of metallic material, or other suitable material. Litter 16 is clumping sand-type cat litter which forms hardened balls out of solid and liquid waste. Conventional cat litter, or any other suitable absorbent material, may also be employed.

Housing 12 includes opposed first and second sidewalls 20 and 22, shown in FIG. 3, opposed front and back walls 24 and 26, shown in FIG. 4, and opposed top and bottom walls 28 and 30, shown in FIG. 5. All of these walls 20, 22, 24, 26, 28 and 30 define an interior space. First opening 34 and a second opening are defined in front wall 24. First opening 34 is configured for permitting the pet to climb in and out of the interior space in order to use the box.

Referring to FIGS. 4, 5 and 12, housing 12 further includes means 38 for separating waste 18 from litter 16, and for removing waste 18 from housing 12. Separation means 38 includes removable drawer 40 having screen 42 with opposed first and second ends 44 and 46, and partition 48 with opposed first and second ends 50 and 52. Screen 42 and partition 48 are attached adjacent their respective second ends 46 and 52 to define V-shaped waste retaining pocket 54.

Drawer 40 also includes top 56, opposed first and second sides 58 and 60, and front 62 having knob 64. Screen 42 is constructed of synthetic resin material and defines between 1–16 apertures per square inch, and preferably between 4–9 apertures per square inch. Screen 42 may alternatively be constructed of metallic material, or other suitable material. Drawer 40 is constructed of synthetic resin material, but may alternatively be constructed of metallic material, or other suitable material.

Opposed first and second upper rails 66 and 68, and opposed first and second lower rails 70 and 72 are provided on first and second sidewalls 20 and 22 adjacent to the second opening. Front rail 74 is provided on front wall 24 adjacent to the second opening. It will be appreciated that the second opening and rails 66, 68, 70, 72 and 74 slidably receive drawer 40.

First and second sides 58 and 60 further include, respectively, opposed first and second annular recesses 76 and 78, which, when drawer 40 is received through the second opening, are adjacent corresponding first and second shoulder portions 80 and 82 provided on sidewalls 20 and 22, shown in FIG. 3. Sidewalls 20 and 22 are slightly resilient, as are sides 58 and 60, so that shoulders 80 and 82 and recesses 76 and 78 cooperably retain drawer 40 in housing 12 through the second opening. Drawer 40 may alternatively be retained by latches, bars, or any other suitable device.

Door 84 is configured for being frictionally fitted to first opening 34 in order to seal housing 12. As depicted in FIG. 13, door 84 includes neck 86 having annular recess 88 along the periphery of neck 86, face 90 having flange 92 and knob 94. Front 24 of housing 12 is slightly resilient, and includes rounded edge 96 configured for receiving recess 88 of neck 86 for frictional engagement of door 84 with first opening 34. Door 84 may be alternatively configured with screw threads, lock tabs, or any other suitable engagement device.

Referring now to FIGS. 1, 3 and 6, support means 14 includes support stand assembly 98 having opposed first and second arms 100 and 102 with respective first and second pivots 104 and 106, and opposed first and second sockets 108 and 110 respectively defined in sidewalls 20 and 22. Pivots 104 and 106 are configured for snapping into sockets 108 and 110 so as to rotatably supporting housing 12. Alternatively, holes configured for receiving pivots 104 and 106 may be provided through sidewalls 20 and 22.

Sidewalls 20 and 22 further include, respectively, opposed first and second annular recesses 112 and 114, which, when housing 12 is supported by pivots 104 and 106, are adjacent corresponding first and second shoulder portions 116 and 118 respectively provided on support arms 100 and 102. In a first rotational position, as depicted in FIG. 3, shoulders 116 and 118 are seated in recesses 112 and 114, thereby retaining housing 12 in the first rotational position. Approximately 20–40 lbs of force are required to unseat shoulder 116 and 118, as arms 100 and 102 and sidewalls 20 and 22 are slightly resilient. It will be appreciated that housing 12 is positively held in place, and will not accidentally begin to rotate as a result of the entrance of the pet into housing 12. However, housing 12 remains rotatable by a person of ordinary strength. Housing 12 may also be held in place by a removable bar, or other suitable restraining device.

Referring again to FIG. 1, support stand assembly 98 includes tray 120 defined by arms 100 and 102, bottom 122, and opposed front and back members 124 and 126. Tray 120 is configured for collecting pet litter 16 which is scattered out of housing 12 by the pet, or which may spill when housing 12 is operated. Alternatively, a carpet lined detachable tray, or other litter catching device may be employed.

In operation, the pet waste box is able to collect, separate and provide for removal of pet waste 18 deposited by a pet in pet litter 16 while minimizing the unpleasant odors, fumes and litter dust problems associated with the prior art devices. Once door 84 is fitted to first opening 34, and drawer 40 is inserted into housing 12 through the second opening, housing 12 is sealed and ready for operation. FIGS. 7–11 show a cycle of use of housing 12 where housing 12 is rotated through one complete revolution so that pet waste 18 is separated from pet litter 16 and is ready for removal by removing drawer 40 from housing 12. The rotation causes waste 18 to be well encrusted with litter 16 ensuring optimum moisture transfer for drying waste 18.

FIG. 7 shows pet waste 18 randomly buried in pet litter 16 and ready for separation. When shoulders 116 and 118 are unseated by application of a force of between about 20–40 lbs, and preferably about 30 lbs, housing 12 will begin to rotate. As housing 12 is rotated to the 90° position, as depicted in FIG. 8, combined pet litter 16 and pet waste 18 begins to flow into drawer 40. It will be appreciated that shoulders 80 and 82 and recesses 76 and 78 cooperably retain drawer 40 within the second opening even under the weight of litter 16 and waste 18.

The cross-section of rails 70, 72 and 74 defines a right triangle. This allows litter 16 and waste 18 to flow into drawer 40, but prevents litter 16 and waste 18 from collecting next to the position adjacent front 62 of drawer 40 and front 24 of housing 12. Collection of litter 16 and waste 18 at this position could lead to spillage of litter 16 and waste 18 from housing 12. The cross-section of rails 70, 72 and 74 may alternatively define other shapes which are suitable for preventing the collection of litter 16 and waste 18 adjacent the above mentioned position. Alternatively, the drawer may provide sealing structure for sealing the drawer edges to front 24 so as to prevent litter from escaping housing 12.

Once housing 12 is rotated to approximately the 135° position, litter 16 begins filtering through screen 42. As housing 12 is rotated to the 180° position, depicted in FIG. 9, approximately half of litter 16 has filtered through screen 42. Partition 48 is angled so that litter 16 and waste 18 are allowed to enter drawer 40. The volume of litter 16 versus the flow rate through screen 42 is such that litter 16 will not accidentally overflow drawer 40 and slip over end 52 of partition 48. Once the housing is rotated to the 270° position, depicted in FIG. 10, most of litter 16 has filtered through screen 42, while waste 18 is retained by screen 42. By providing screen 42 having between about 4–9 apertures per square inch, housing 12 may be rotated relatively fast and still allow drawer 40 retain waste 18.

After housing 12 is rotated back to its starting position, depicted in FIG. 11, waste 18 is fully separated from litter 16. It will be appreciated that the angle defined by screen 42 and partition 48 is sufficient to allow litter 16 and waste 18 to enter drawer 40, and to retain waste 18. This angle is between about 30°–60°, and is preferably 45°.

Drawer 40 is also configured so that housing 12 may be rotated numerous times while retaining a quantity of waste 18 so as to collect and accumulate additional quantities of waste 18. Such a configuration allows housing 12 to be rotated several times to ensure thorough cleaning of litter 16, if need be.

Allowing housing 12 to remain undisturbed for such a period of time after rotation also allows any airborne dust in housing 12 to settle. Thus the dust associated with rotation of housing 12, which may cause lung infections, is not allowed to escape into the environment surrounding the box.

Once the dust has settled, door 84 may be removed, and the box again is ready for use by the pet.

Waste 18 is removed from housing 12 by removing drawer 40 from the second opening, and emptying waste 18 into an appropriate receptacle. Removal of waste 18 may be accomplished at a selected interval after separation. Therefore, by waiting a certain amount of time after rotation, waste 18 will be sufficiently dry so as to reduce to a minimum the unpleasant and noxious odors and fumes exuded by waste 18, which may cause nausea.

Of course, if the dust settles before waste 18 dries, door 84 may be opened, and the box may be used while waste 18 dries. Since opening 34 is small relative to the size of housing 12, most odors associated with waste 18 while it dries will remain within housing 12. Removal of door 84 also allows air to flow through drawer 40 and the interior space of housing 12 which results in drying waste 18 more rapidly and efficiently than prior art devices.

Since the pet waste box is configured so that it may be used by the pet while waste 18 dries, and so that housing 12 may be rotated numerous times for separating and accumulating additional quantities of waste 18, it will be appreciated that drawer 40 may be removed less frequently than housing 12 is rotated. For example, while housing 12 may be rotated once per day, drawer 40 may only be removed once per week. As mentioned above, most of the odors and fumes associated with waste 18 do not escape the interior space of housing 12. Therefore, by allowing removal of drawer 40 and disposal of waste 18 at less frequent intervals than rotation of housing 12, litter 16 is kept relatively clean and odor free, while required maintenance of the box is kept relatively simple. Additionally, the waste drying features provide continuous odor reduction in between the emptying cycles of drawer 40.

It will also be appreciated that at the end of a cycle of use, litter 16 comes to rest in an angled manner on the side of housing 12 opposite first opening 34, as shown in FIG. 11. In use, this causes the pet using the pet waste box to be as far as possible from opening 34 while depositing waste 18. Therefore, less litter 16 is kicked and scattered from housing 12 than in the prior art.

The pet waste box also allows litter 16 to be periodically changed by first removing drawer 40 from the second opening. A receptacle is positioned adjacent to housing 12 so that as housing 12 is rotated in the direction opposite to that shown in FIGS. 7–11, litter 16 exits housing 12 through the second opening. Fresh litter may then be added to housing 12.

Housing 12 may alternatively be removed from support stand assembly 98 and tilted by hand to allow litter 16 to exit housing 12 through the second opening into the receptacle. Once fresh litter is added, housing 12 is placed back on support stand assembly 98. This procedure would allow housing 12 to be carried to a remote location from human living quarters in order to prevent the spread of any residual odors, fumes and dust.

Cleaning the pet waste box is also an easy task. Generally, the waste box is cleaned during the litter changing process after litter 16 has been removed from housing 12. It will be appreciated that a cleaning agent, such as a mixture of dish washing soap and water, may be injected into housing 12 through the second opening. Both the first and second openings are large enough to allow a person to reach into the interior space of housing 12 for any needed scrubbing.

Although the pet waste box of the present invention has been described with reference to the illustrated preferred embodiment, it is noted that variations and changes may be made, and equivalents employed without departing from the scope of the invention as described in the claims. FIG. 2, for example, discloses an alternative embodiment of the pet waste box including cylindrical housing 128 having opposed first end wall 130 and a second end wall.

First opening 134 is defined in first end wall 130 and permits passage of a pet into and out of housing 128. Door 136, which is similar to door 84 of the preferred embodiment, may be frictionally fitted to opening 134 to seal housing 128. A second opening is defined in housing 128 and is configured for receiving drawer 138. Drawer 138 includes a similar screen and partition configuration as drawer 40 of the preferred embodiment, and is thus able to separate pet waste from pet litter, and retain the waste until it is removed from housing 128.

Support assembly 140 includes opposed sets of rollers 142 and 144 which rotatably support housing 128. It will be appreciated that roller sets 142 and 144 allow housing 128 to be rotated for separation of the waste from the litter. Roller sets 142 and 144 are preferably friction bearing nubs which prevent rotation of housing 128 during use by the pet, but allow rotation of housing 128 when desired for separation of waste 18 from litter 16. Other suitable devices which rotatably support housing 128 may alternatively be used. Assembly 140 also includes tray 146 which is positioned beneath housing 128 to catch any litter which is scattered out of housing 128 by the pet.

Referring to FIG. 1, first opening 34 and corresponding door 84 are shown as being substantially circular. They may, alternatively, have other shapes and sizes, such as elliptical, rectangular and triangular, as well as irregular shapes. A door which is hingedly attached to housing 12 adjacent first opening 34 may also be provided as an alternative to door 84. First opening 34 may alternatively be defined in the wall opposite that of drawer 40.

As depicted in FIG. 12, partition 48 of the preferred embodiment is positioned substantially within drawer 40. However, a drawer may alternatively be provided having a partition and screen which define an angle of about 60°–120°, and are oriented so that the screen is positioned between the partition and the drawer front so that the screen and partition define a waste retaining pocket. Such a drawer would require that housing 12 be rotated in a direction opposite that of the preferred embodiment shown in FIGS. 7–11. Additionally, a partition defining a bowed or cupped cross-section may be substituted for partition 48.

Housing 12 may alternatively be used without support means 14. In operation, housing 12 could be easily rotated by hand so that the combined litter 16 and waste 18 enter drawer 40 for separation of waste 18 from litter 16. For example, housing 12 could be rotated along the ground in a tumbling motion. Housing 12 could also be lifted and rotated by hand. Since such a device would not include the bulk of support means 14, it would have the advantage of more easily fitting into smaller spaces.

Housing 12 does not include a carrying handle. Such a handle could be easily added which may be desirable for purposes of portability. A handle which would assist in rotating housing 12 may also be provided. The second opening is substantially rectangular as is front 62 of drawer 40. The second opening and front 62 may alternatively have other suitable shapes and sizes.

The pet waste box may also include an automated means for rotating housing 12, opening door 84, and removing drawer 40. Automation would, of course, come at the expense of added weight, cost and complexity.

What is claimed is:

1. A pet waste box comprising:

a housing including a plurality of walls defining an interior space for retaining pet litter and pet waste, and an opening through which a pet can enter and exit the housing;

means for closing the opening, the closing means including a door having structure for frictionally retaining the door to the opening so that the housing is substantially air-tight;

means for supporting the housing for rotation about a horizontal axis such that the litter moves along a circular path movement through the interior of the housing;

a screen supported in the housing and extending across the path of movement of the litter so that the litter passes through the screen during rotation of the housing through 360°, the screen presenting numerous apertures of a size adapted to permit passage of the litter while blocking waste so that the waste is separated from the litter;

retaining means supported in the housing for retaining the blocked waste separate from the litter subsequent to rotation of the housing; and the housing including a removable element on which the retaining means is supported, the element being removable for removing the retaining means from the interior to permit disposal of the waste.

2. The pet waste box as set forth in claim 1, the housing having a tubular configuration, and opposed first and second end walls, the support means including a support stand having a plurality of sets of opposed first and second rollers configured for rotatably supporting the housing.

3. The pet waste box as set forth in claim 2, the support stand including a tray positioned beneath the housing.

4. A pet waste box comprising;

a housing including a plurality of walls defining an interior space for retaining pet litter and pet waste, and an opening through which a pet can enter and exit the housing, means for permitting rotation of the housing about a horizontal axis such that the litter moves along a generally circular path through the interior of the housing;

a screen supported in the housing and extending across the path of movement of the litter so that the litter passes through the screen during rotation of the housing through 360°, the screen presenting numerous apertures of a size adapted to permit passage of the litter while blocking waste so that the waste is separated from the litter; and retaining means supported in the housing for retaining the blocked waste separate from the litter subsequent to rotation of the housing, the housing including a removable element on which the retaining means is supported, the element being removable for removing the retaining means from the interior to permit disposal of the waste, the screen having opposed first and second ends, and the retaining means including a waste retaining partition having opposed first and second ends, the second end of the partition being positioned adjacent the second end of the screen, the partition and the screen configured for retaining the separated waste therebetween as the housing is rotated.

5. The pet waste box as set forth in claim 4, the partition and the screen defining an angle therebetween of about 0°–90°.

6. The pet waste box as set forth in claim 4, the partition and the screen defining an angle therebetween of about 45°.

7. The pet waste box as set forth in claim 4, the removable element comprising a drawer, the housing including rails mounted within the housing configured for slidably receiving the drawer.

8. The pet waste box as set forth in claim 4, the housing having opposed first and second sidewalls, the means for permitting rotation of the housing including a support stand having opposed first and second arms, and means for pivotally coupling the first and second sidewalls of the housing respectively with the first and second arms of the stand.

9. The pet waste box as set forth in claim 8, the support stand including a tray positioned beneath the housing.

10. A pet waste box comprising:

a rotatable housing including opposed first and second sidewalls, opposed front and back walls, and opposed top and bottom walls, the walls defining an interior space for retaining pet litter and pet waste, a first opening through which a pet can enter and exit the housing, and a second opening;

a removable door having structure for retaining the door to the housing adjacent the first opening so that the housing is substantially airtight; and a removable drawer received through the second opening and positioned within the housing, the drawer including a waste separation screen presenting opposed first and second ends, and a waste retaining partition presenting opposed first and second ends, the second end of the screen being mounted adjacent the second end of the partition so that as the housing is rotated 360° the litter moves along the bottom, front, top and back walls, the screen separates the waste from the litter, and the waste is retained between the screen and partition.

11. The pet waste box as set forth in claim 10, further including, a support stand having opposed first and second arms, and means for pivotally coupling the first and second sidewalls of the housing respectively with the first and second arms of the stand.

12. The pet waste box as set forth in claim 11, the support stand including a tray positioned beneath the housing.

* * * * *